United States Patent [19]

Norton

[11] 4,079,302

[45] Mar. 14, 1978

[54] METHODS AND APPARATUS FOR CORRECTING SERVO SIGNALS

[75] Inventor: Clyde J. Norton, Van Nuys, Calif.

[73] Assignee: Bell & Howell Company, Chicago, Ill.

[21] Appl. No.: 644,352

[22] Filed: Dec. 29, 1975

[51] Int. Cl.² .......................................... G05D 23/275
[52] U.S. Cl. .................................... 318/632; 318/608
[58] Field of Search ............... 318/608, 629, 632, 633, 318/16; 307/233 A

[56] References Cited

U.S. PATENT DOCUMENTS

| 3,555,254 | 1/1971 | Gerber | 318/632 |
| 3,740,627 | 6/1973 | Martin et al. | 318/16 |

Primary Examiner—Robert K. Schaefer
Assistant Examiner—Michael K. Mutter
Attorney, Agent, or Firm—Benoit Law Corporation

[57] ABSTRACT

A periodic electric signal component in a variable input signal of a servo system is compensated by providing an electric signal corresponding in wave form to the periodic signal component, synchronizing the corresponding signal with the periodic electric signal component and compensating the periodic electric signal component with the synchronized corresponding signal.

12 Claims, 4 Drawing Figures

METHODS AND APPARATUS FOR CORRECTING SERVO SIGNALS

BACKGROUND OF THE INVENTION

1. Field of the Invention

The subject invention relates to methods and apparatus for compensating periodic electric signal components in servo control signals and, more specifically, to tachometer type servo systems.

2. Description of the Prior Art

Periodically recurring error signals are a notorious source of malfunction and design and application limitation in servo systems. In particular, a periodic error signal component in a variable input signal of a servo system causes the system to malfunction or at least operate at less than its inherent potential on the one hand and, on the other hand, calls for corrective measures which either render the system expensive or introduce limitations in the full use of the system.

By way of example, periodic error signals in a tachometer signal of a servo of a rotating drive provoke angular velocity perturbations which affect the performance of the system.

The prior-art effort in this area has been mainly concerned with the source of the periodic disturbance. In particular, most remedial attempts have focused on a mechanical perfection of the parts at the location of generation of the periodic disturbance. Pursuant to this attitude the typical remedial approach to periodic error signals in a tachometer signal has culminated in attempts to perfect the tachometer and the equipment coupled thereto and to the associated electromechanical drive.

This, in turn, has introduced design and manufacturing complexities, has increased the expense of the resulting equipment, and has subjugated attainable performance to the dictates of mechanical design and feasibility limitations.

Prior-art attempts to solve the problem electronically have not been sufficiently effective as to permit a material reduction of the need for mechanical solutions of the above mentioned type.

SUMMARY OF THE INVENTION

It is a broad object of this invention to overcome the above mentioned disadvantages.

It is a related object of this invention to provide a new approach to the problem of compensating a periodic electric signal component in a variable input signal of a servo system.

It is a germane object of this invention to provide improved methods and apparatus of compensating periodic electric error signals.

It is also an object of this invention to provide improved methods and apparatus for compensating, in a tachometer signal of a servo control of a rotating drive, an electric signal component having a waveform recurring with each revolution of the rotating drive.

It is a further object of this invention to provide improved servo systems.

It is also an object of this invention to provide improved servo control-type transports for magnetic tape and other web or tape-like material.

Other objects of the invention will become apparent in the further course of this disclosure.

From one aspect thereof, the invention resides in a method of compensating a periodic electric signal component in a variable input signal of a servo system, comprising in combination the steps of providing an electric signal corresponding in waveform to the periodic signal component, synchronizing this corresponding signal with the periodic electric signal component and compensating the periodic electric signal component with the synchronized corresponding signal.

From another aspect thereof, the invention resides in a method of eliminating from a tachometer signal of a servo control of a rotating drive, an electric error signal component having a waveform recurring with each revolution of the rotating drive, comprising in combination the ateps of providing an electric signal having a waveform corresponding to the waveform of the signal component, synchronizing the corresponding waveform with the revolution of said rotating drive, and eliminating the error signal component with the aid of the provided signal having the synchronized corresponding waveform.

From a further aspect thereof, the invention resides in a servo system wherein a variable servo signal is affected by a periodic electric signal component and, more specifically, resides in the improvement comprising, in combination, means for providing an electric signal corresponding in waveform to the periodic signal component, means coupled to the servo system and to the signal providing means for synchronizing the corresponding signal with the periodic electric signal component, and means coupled to the signal providing means and to the servo system for compensating the periodic signal component with the synchronized corresponding signal.

From yet another aspect thereof, the invention resides in a servo system wherein a tachometer signal of a servo control of a rotating drive is affected by an electric error signal component having a waveform recurring with each revolution of the rotating drive. The invention according to this aspect resides in the improvement comprising, in combination, means for providing an electric signal having a waveform corresponding to the waveform of the signal component, means coupled to the servo system and to the signal providing means for synchronizing the corresponding waveform of the provided signal with the revolution of the rotating drive, and means coupled to the signal providing means and to the servo system for eliminating the error signal component with the aid of the provided signal having the synchronized corresponding waveform.

From another aspect thereof, the invention resides in a method of eliminating from a tachometer signal having a frequency varying as a function of angular velocity of a rotary drive an electric error signal component having a waveform recurring with each revolution of the rotary drive, comprising in combination the steps of detecting zero crossovers of the tachometer signal, counting down the tachometer signal for a division of the frequency, generating in response to the counted-down tachometer signal a waveform corresponding to the waveform of the error signal component, synchronizing the corresponding waveform with the revolution of the rotary drive, and modulating the zero crossovers of the tachometer signal with the synchronized waveform to eliminate the electric error signal component.

From another aspect thereof, the invention resides in a servo system wherein a tachometer signal having a frequency varying as a function of angular velocity of a rotary drive is affected by an electric error signal component having a waveform recurring with each revolution of the rotary drive. The invention according to this aspect resides in the improvement comprising, in combination, means for detecting zero crossovers of the tachometer signal, means for counting down the tachometer signal for a division of the frequency, means connected to the counting down means for generating in response to the counted-down tachometer signal a waveform corresponding to the waveform of the error signal component, means connected to the counting down means for synchronizing the corresponding waveform with the revolution of the rotary drive, and means connected to the detecting means for modulating the zero crossovers of the tachometer signal with the synchronized waveform to eliminate the electric error signal component.

BRIEF DESCRIPTION OF THE DRAWINGS

The invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
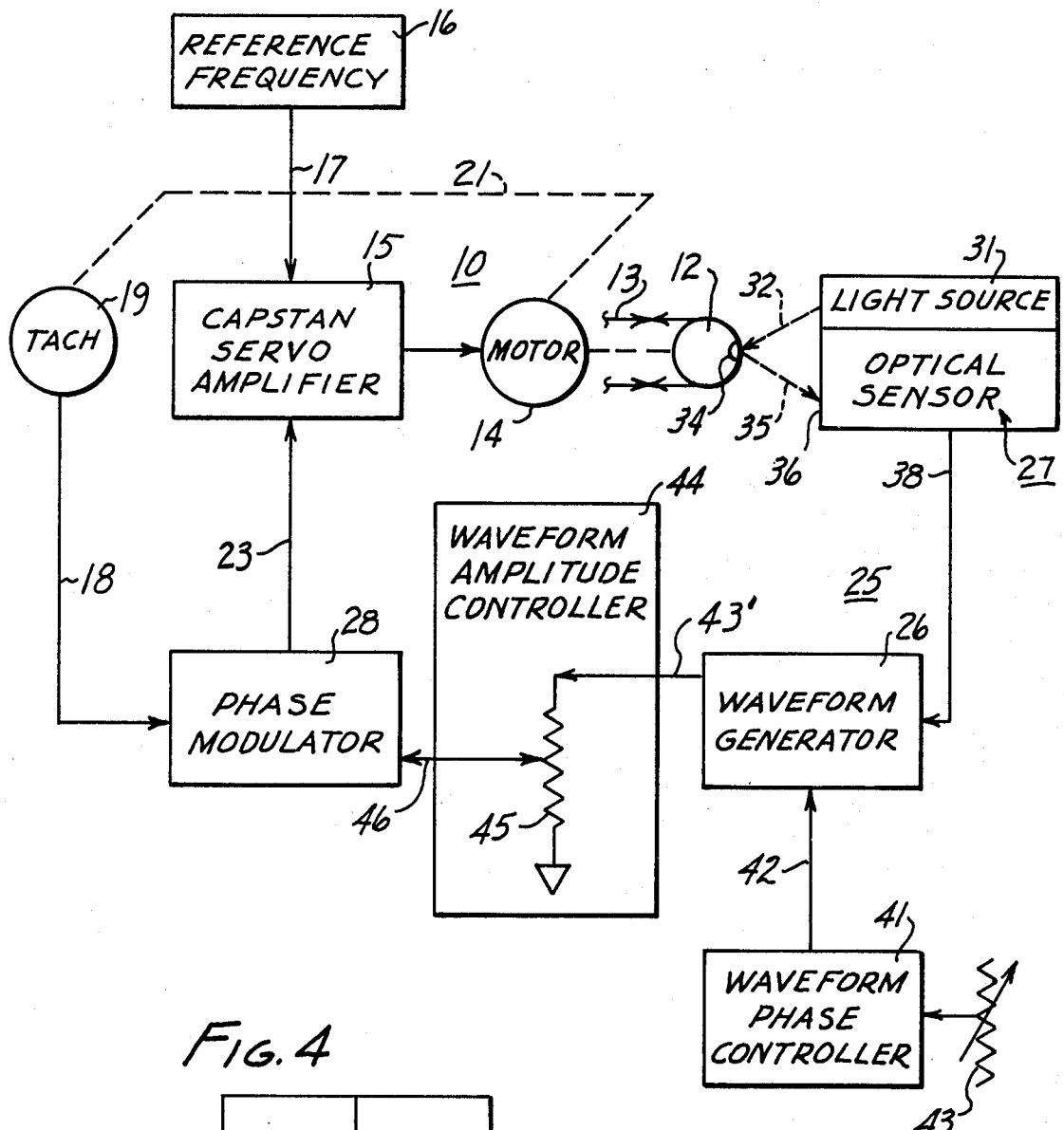
FIG. 1 is a block diagram of a servo-controlled magnetic tape drive embodying a preferred embodiment of the subject invention.
Figure 4:
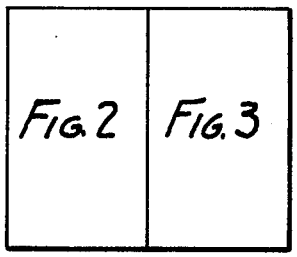
FIG. 4 indicates how FIGS. 2 and 3 should be juxtaposed.

The tape drive 10 shown in FIG. 1 has a capstan 12 for advancing a magnetic recording tape 13 in either direction. An electric motor 14 rotates the capstan 12. The motor 14 is energized and controlled by a capstan servo amplifier 15 which may be of a conventional type.

In accordance with conventional practice, the capstan servo amplifier 15 is controlled with the aid of a reference frequency signal provided by a reference frequency source 16 via a line 17 and by a tachometer frequency signal provided via a line 18 by a tachometer 19 which is coupled to and driven by the motor 14 as indicated by the dotted line 21.

The tachometer 19 may, for instance, be of an electromechanical type or preferably of an optical encoder type generating a tachometer signal, the frequency of which varies as a function of angular velocity.

The part of the system of FIG. 1 so far described may be of a conventional type. In fact, the part of the system so far described may be operated conventionally by connecting the line 18 directly to a line 23 which leads to an input of the capstan servo amplifier 15. In that case, the motor 14 and capstan 12 would be directly controlled by the tachometer signal with reference to the stable frequency provided by the source 16. The tachometer 19, the servo amplifier 15, the motor 14 and the coupling 21 would thereby provide a closed servo system of a type well known per se in magnetic tape transports and many other forms of equipment.

In practice, the tachometer signal provided via line 18 is typically affected by a periodic error signal component. The reasons for such periodic error signals are well known and include, for instance, a condition of eccentricity which causes the tachometer to include in its generated signal an error signal component having a waveform recurring with each revolution of the rotating drive including the capstan 12 and motor 14. In consequence, velocity perturbations occur in the advance of the magentic tape and reflect themselves in corresponding disturbances in the signal recorded on and played back from the tape 13.

In accordance with the principles of the subject invention, the apparatus 10 of FIG. 1 includes equipment 25 which has a waveform generator 26 for providing an electric signal corresponding in waveform to the periodic signal component in the tachometer signal in the line 18, an optical sensor 27 for synchronizing the corresponding signal provided by the waveform generator 26 with the periodic electric signal component provided by the tachometer 19, and a phase modulator 28 for compensating the periodic electric signal component provided by the tachometer 19 with the synchronized corresponding signal provided by the synchronized waveform generator 26.

By way of example, the sensor 27 may include a light source 31 which directs a beam of light 32 toward the rotating capstan 12. A light-reflective spot on the capstan, symbolically indicated at 34, reflects the light beam 32, as indicated at 35, from the light-reflective spot 34 on the the capstan 12 to an optical sensing device at 36 of the sensor 27.

This luminous energization of the sensor 27 occurs once during each revolution of the capstan 12 in phase synchronization with the rotation of the tachometer 19.

In response to each luminous energization by the reflected light beam 35, the sensor 27 issues a synchronization pulse via a line 38 to the waveform generator 26 in order to synchronize the output signal of the waveform generator with the periodic electric signal component in the output signal of the tachometer 19.

It will be recognized at this juncture, that the phase synchronization of the waveform generator 26 is not limited to the use of a light-reflective spot 34 on the capstan 12. In principle, magnetic, inductive or mechanical devices may be employed to sense the rotational position of the capstan 12. Familiar examples include make and break contacts operated by a cam connected to the capstan 12, magnetic reed switches operated by a magnet attached to the capstan 12, inductive coils periodically subjected to the influence of a ferromagnetic vane attached to the capstan 12, and capacitive sensing devices having a stationary capacitor plate positioned adjacent the capstan 12 and a movable capacitor plate connected to the capstan. Moreover, the phase of the rotation of the tachometer 19 may be sensed by by sensing the phase position of the movable part of the tachometer 19 itself, or of any other part of the apparatus 10 which rotates in phase synchronism with the tachometer 19, such as the shaft of motor 14 itself.

A waveform phase controller 41 is connected to the waveform generator 26 by a line 42, and has an adjustable element 43 for an adjustment of the phase of the output signal of the waveform generator 26. This output signal is applied via a line 43' to a waveform amplitude controller 44 which has an adjustable element for an adjustment of the amplitude of the output signal of the waveform generator 26, such as a potentiometer 45.

The amplitude-adjusted signal is applied by a line 46 to a second input of the phase modulator 28. This second input signal of the phase modulator 28 corresponds not only in amplitude and waveform to the periodic electric error signal component in the output signal of the tachometer 19, but is also phase synchronized therewith. The phase modulator 28, or any equivalent equipment, is thus readily capable of compensating the periodic electric signal component in the output of the tachometer 19 so as to eliminate or at least render negligible that error signal.

By way of example, the waveform generator 26 may provide the mentioned corresponding electric signal occurring in the lead 46 with a polarity that is opposite to the polarity of the periodic error signal component in the output of the tachometer 19. The synchronization pulse occurring in the line 38 would then synchronize the mentioned opposite polarity signal with the periodic error signal of the tachometer output, and that periodic error signal would then be compensated with the synchronized opposite polarity signal occurring in the lead 46.

Figure 2:
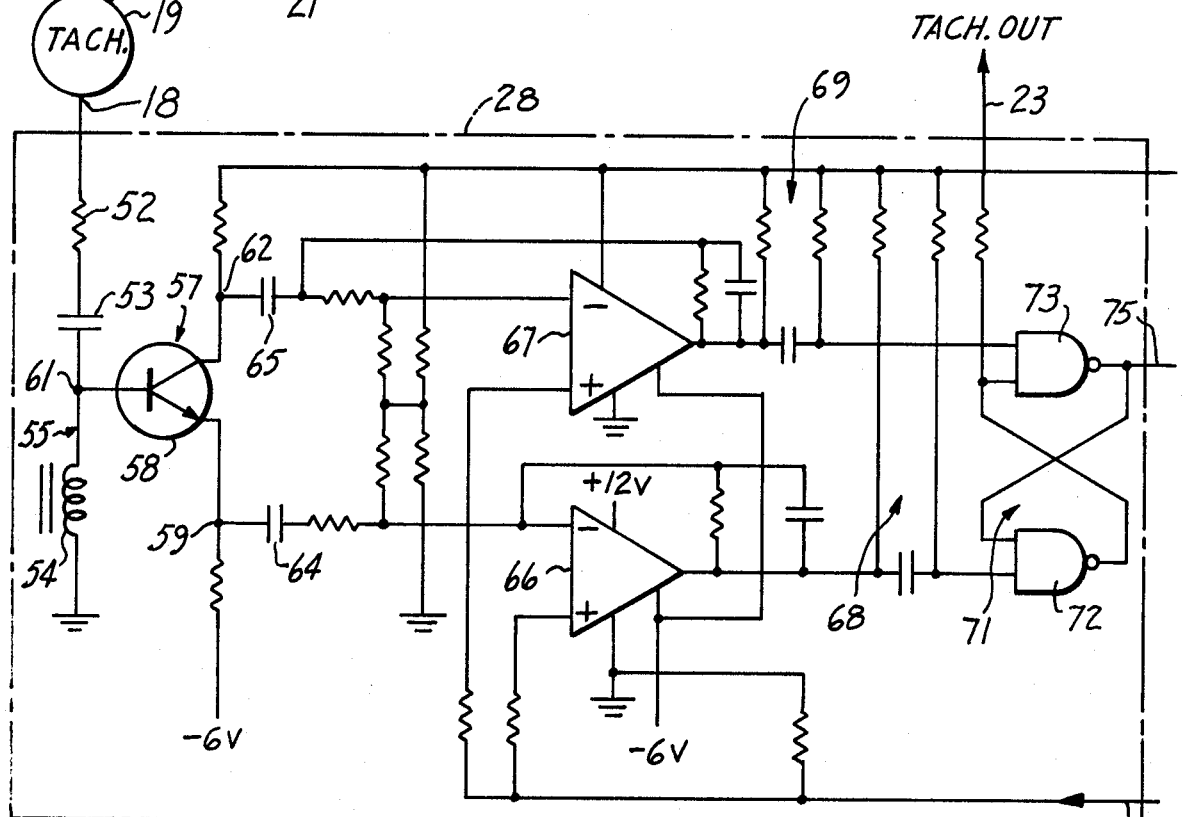
FIGS. 2 and 3 constitute a circuit diagram of periodic error compensating equipment in accordance with a preferred embodiment of the subject invention that may be implemented in the apparatus of FIG. 1.
Figure 2:
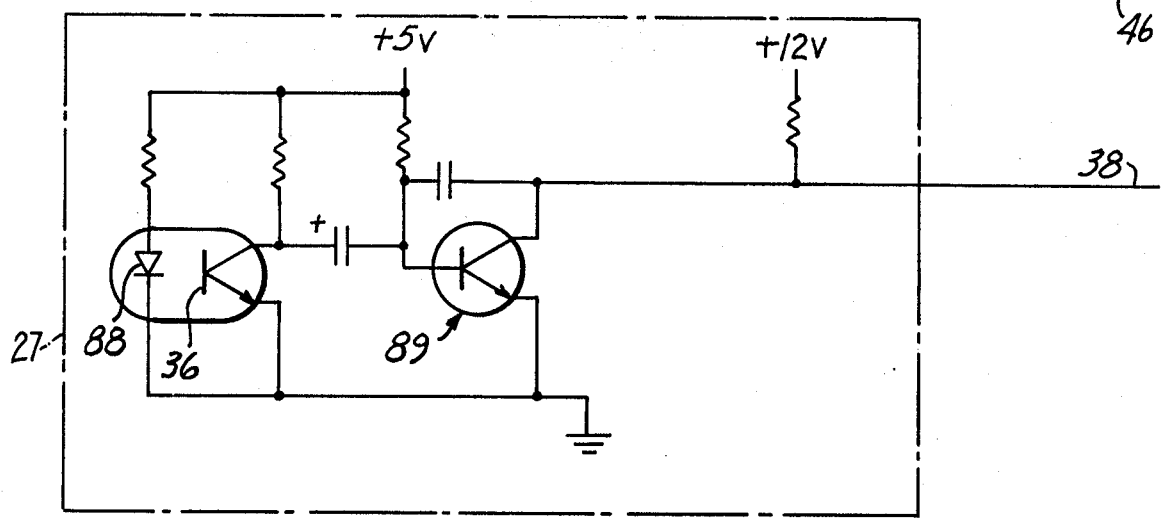
Figure 3:
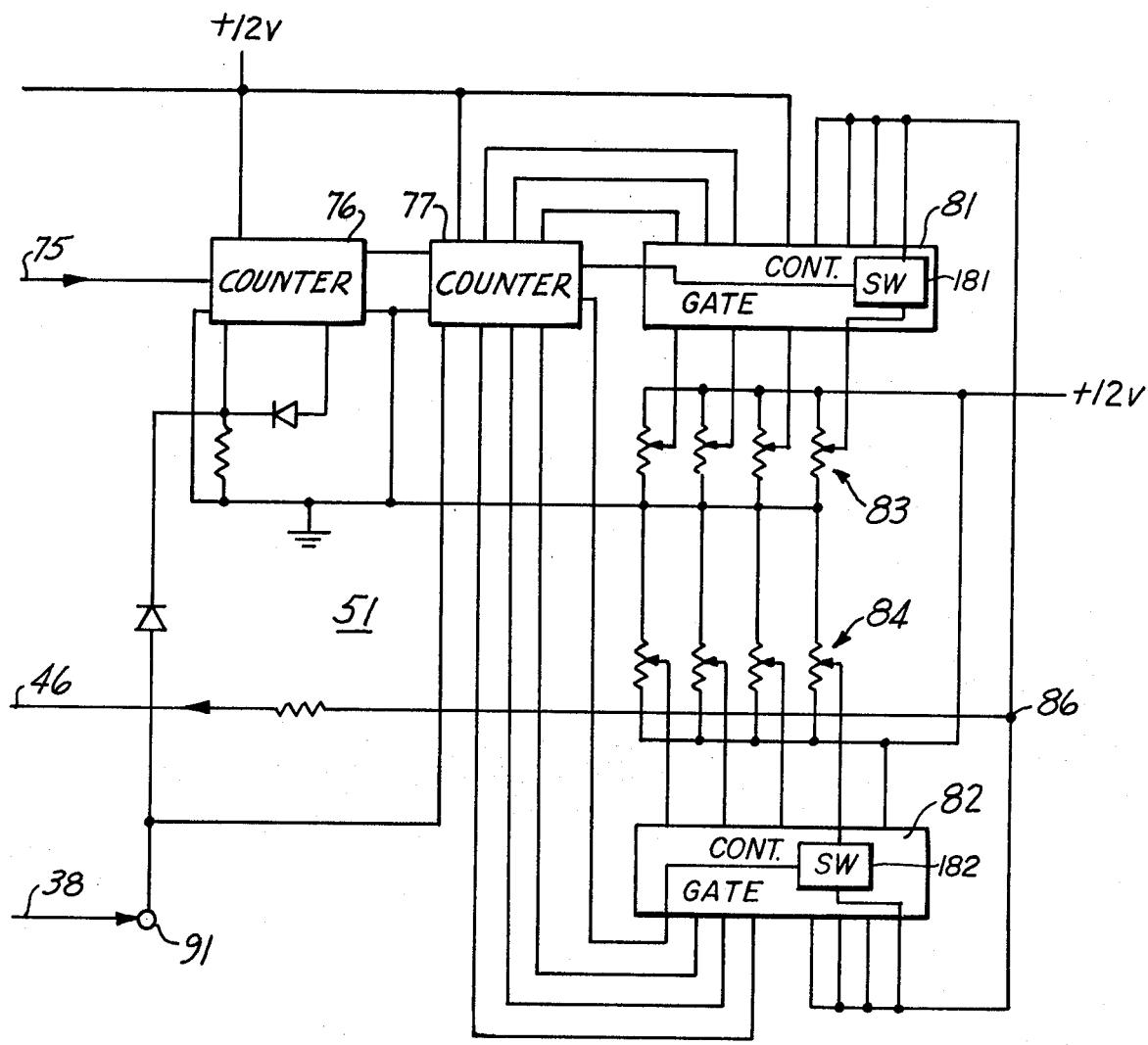

In this manner, the capstan servo amplifier 15 is provided via a lead 23 with a tachometer signal that is essentially free of periodic disturbances whereby the servo system can perform its task more effectively and a certain eccentricity in the operation of the tachometer can be tolerated. Specific circuitry for the practice of the subject invention in accordance with a preferred embodiment is shown in FIGS. 2 and 3. In particular, FIG. 2 shows circuitry for the components 27 and 28, while the circuitry for the components 26, 41 and 44 is lumped together in a component 51 shown in FIG. 3.

The component 28 as shown in FIG. 2 comprises not only the phase modulator as such, but includes also circuits for processing the tachometer output signal provided by the tachometer 19 via the line 18.

By way of example, and for the purposes of FIGS. 2 and 3, the tachometer 19 may be of the familiar optical encoder type in which a light-transparent disc bears opaque radial lines and is rotated by the motor 14 via a coupling 21 relative to an optical sensor in order to provide an output signal at 18 with a frequency varying as a function of motor speed.

The tachometer output signal is applied by the lead 18 to a coupling resistor 52 and coupling capacitor 53 which, together with an inductor 54, form a high-pass filter 55 for an elimination of low-frequency variations not pertinent to the operation of the system.

A phase splitter 57 connected to the filter 55 includes a transistor 58 which at an emitter terminal 59 provides a signal which is equal in amplitude and phase to the signal occurring at a point 61 in the filter 55 and, at a collector terminal 62 provides a signal which is equal in amplitude but 180° out of phase to the signal occurring at 61.

The phase split signals are applied from the points 59 and 62 via the coupling capacitors 64 and 65 to voltage comparators 66 and 67 which handle alternate edges of a square wave comprising the tachometer output signal. By way of example, the voltage comparators 66 and 67 may be of the type LM311 as described, for instance, in the National Semiconductor Linear Integrated Circuits Catalog (Linear Data Handbook) pp. 3-12 to 3-16.

The output signals of the comparators 66 and 67 are differentiated at 68 and 69 to be applied to an RS flip-flop 71 comprised of cross-connected NAND gates 72, 73. By way of example, these NAND gates may be of the type SN7400 described in The Integrated Circuits Catalog for Design Engineers, First Edition, CC-401, by Texas Instruments, p. 6-5.

The parts of FIG. 2 so far described constitute a zero crossing detector as to the sinusoidal tachometer output.

It is the purpose of the synchronized waveform generating equipment shown in FIG. 3 to simulate the inverse eccentricity of the capstan and to accordingly phase modulate the zero crossing detector of FIG. 2 for a compensation of periodic error signals in the tachometer output signal.

To this end, a lead 75 applies the square wave from the output of the RS flip-flop 71 to the input of a binary counter 76 which cooperates with a further binary counter 77 in order to count down the tachometer signal for a division of the tachometer frequency equal to the number of lines on the above mentioned tachometer disk. By way of example, the counter 76 may be a COS/MOS 12-Stage Ripple-Carry Binary Counter/Divider type CD4040AE described, for instance, in the RCA Solid State '74 DATABOOK Series SSD-203B, pp. 197 to 202. Also by way of example, the counter 77 may be a COS/MOS Divide-By 8 Counter/Divider type CD4022AE described, for instance, on pp. 115 to 119 of said DATABOOK.

The outputs of the counter 77 are applied to two analog gates 81 and 82 which are weighted by potentiometer banks 83 and 84. By way of example, the gates 81 and 82 may be COS/MOS Quad Bilateral Switches type CD4016AE shown, for instance, at pp. 84 to 89 of said RCA DATABOOK.

The potentiometer bank 83 covers the positive half-cycle, while the potentiometer bank 84 covers the negative half-cycle of the waveform generated by the circuitry shown in FIG. 3. Each of the potentiometers in the banks 83 and 84 is set to provide each covered point of the generated waveform with an amplitude that corresponds to the amplitude (or if desired to the inverse of the amplitude) of the corresponding point of the periodic error component in the tachometer output signal. In the preferred embodiment shown in FIG. 3 the potentiometer banks 83 and 84 combine the function of the adjustable element 43 of the waveform phase controller 41 and the function of the potentiometer 45 shown in FIG. 1.

As apparent from the above mentioned RCA DATABOOK, page 84, each integrated circuit type CD4016AE has four switch elements SW. By way of illustration, only one of these is shown at 181 in the gate 81 and at 182 in the gate 81; it being understood that each gate 81 and 82 actually has four switches SW as shown in the above mentioned DATABOOK. The control or CONT. lead of each switch SW is energized by the counter 77, counting down the tachometer signal equal to the number of lines of the above mentioned tachometer disk, as set forth above.

As a result, there occurs at a terminal 86 a waveform which simulates periodic errors during one capstan revolution. For proper compensation, this waveform has to be phase-synchronized with the error waveform to be compensated thereby. To this end, phase synchronization equipment including the above mentioned optical sensor 27 may be provided as shown in FIG. 2.

In particular, the sensor 27 may include a light emitting diode 88 (LED) which emits the above mentioned light beam 32 that, upon reflection by the spot 34, actinically energizes a phototransistor 36 which, in turn, controls a buffer amplifier 89.

The buffer amplifier 89 thus issues a synchronization pulse via the line 38 to a terminal 91 of the waveform generating equipment shown in FIG. 3. The counting equipment including the counter 77 is thus periodically reset whereby the generated waveform that occurs at the terminal 86 and is applied to the phase modulate zero detector via the line 46, is phase-synchronized to the waveform of the periodic disturbance of the tachometer output signal.

The resulting tachometer signal, cleansed of the periodic disturbance, is applied via the lead 23 (see FIGS. 1 and 2) as a servo control input signal to the capstan servo amplifier 15 (see FIG. 1) to control the velocity of the tape or capstan drive motor 14.

It will in this connection be recognized that the waveform generating equipment herein disclosed may provide a version of the synchronized corresponding signal being opposite in polarity to the periodic error signal component, and that such periodic error signal component may be compensated in the tachometer signal with such version of the synchronized corresponding signal of such opposite polarity.

The waveform generator is variable to permit a setting thereof in accordance with any desired waveform that is to be simulated and compensated. The variable waveform generator is phase synchronized via the terminal 91 shown in FIG. 3.

In this manner, the invention and its illustrated preferred embodiments meet the initially stated objectives.

Modifications and variations within the spirit and scope of the invention will become apparent from, or will be suggested by, the subject extensive disclosure to those skilled in the art.

I claim:

1. A method of eliminating from a tachometer signal of a servo control of a rotating drive an electric error signal component having a waveform recurring with each revolution of said rotating drive, comprising in combination the steps of:
   providing an electric signal having a waveform corresponding to said waveform of said signal component;
   synchronizing said corresponding waveform with the revolution of said rotating drive; and
   eliminating said error signal component with the aid of said provided signal having said synchronized corresponding waveform.

2. A method as claimed in claim 1, wherein:
said corresponding waveform of said provided signal is provided with a polarity opposite to the polarity of said electric signal component waveform;
said opposite polarity waveform of said provided signal is synchronized with the revolution of said rotating drive; and
said error signal component is eliminated with the aid of said provided signal having said synchronized corresponding opposite polarity waveform.

3. In a servo system wherein a tachometer signal of a servo control of a rotating drive is affected by an electric error signal component having a waveform recurring with each revolution of said rotating drive, the improvement comprising in combination:
   means for providing an electric signal having a waveform corresponding to said waveform of said signal component;
   means coupled to said servo system and to said signal providing means for synchronizing said corresponding waveform of said provided signal with the revolution of said rotating drive; and
   means coupled to said signal providing means and to said servo system for eliminating said error signal component with the aid of said provided signal having said synchronized corresponding waveform.

4. A servo system as claimed in claim 3, wherein:
said apparatus includes means for providing a version of said synchronized corresponding waveform being opposite in polarity to said waveform of said signal component; and
said eliminating means include means for eliminating said error signal component with the aid of said opposite polarity version of said synchronized corresponding waveform.

5. A servo system as claimed in claim 3, wherein:
said synchronizing means include means for sensing revolutions of said rotating drive, and means connected to said revolution sensing means and to said corresponding waveform providing means for synchronizing said corresponding waveform providing means in response to said sensed revolutions.

6. A servo system as claimed in claim 3, wherein:
said corresponding waveform providing means include a variable waveform generator.

7. A servo system as claimed in claim 6, wherein:
said synchronizing means include means connected to said waveform generator for synchronizing said variable waveform generator.

8. A servo system as claimed in claim 6, wherein:
said synchronizing means include means for sensing revolutions of said rotating drive, and means connected to said revolution sensing means and to said variable waveform generator for synchronizing said waveform generator in response to said sensed revolutions.

9. A method of eliminating from a tachometer signal having a frequency varying as a function of angular velocity of a rotary drive an electric error signal component having a waveform recurring with each revolution of said rotary drive, comprising in combination the steps of:
   detecting zero crossovers of said tachometer signal;
   counting down said tachometer signal for a division of said frequency;
   generating in response to said counted-down tachometer signal a waveform corresponding to said waveform of said error signal component;
   synchronizing said corresponding waveform with the revolution of said rotary drive; and
   modulating said zero crossovers of said tachometer signal with said synchronized waveform to eliminate said electric error signal component.

10. A method as claimed in claim 9, wherein:
said corresponding waveform is provided with a polarity opposite to the polarity of said electric error signal component waveform;
said opposite polarity waveform of said provided signal is synchronized with the revolution of said rotary drive; and
said zero crossovers of said tachometer signal are modulated with said synchronized opposite polarity waveform to eliminate said electric error signal component.

11. In a servo system wherein a tachometer signal having a frequency varying as a function of angular velocity of a rotary drive is affected by an electric error signal component having a waveform recurring with each revolution of said rotary drive, the improvement comprising in combination:
  means for detecting zero crossovers of said tachometer signal;
  means for counting down said tachometer signal for a division of said frequency;
  means connected to said counting down means for generating in response to said counted-down tachometer signal a waveform corresponding to said waveform of said error signal component;
  means connected to said counting down means for synchronizing said corresponding waveform with the revolution of said rotary drive; and
  means connected to said detecting means for modulating said zero crossovers of said tachometer signal with said synchronized waveform to eliminate said electric error signal component.

12. A servo system as claimed in claim 11, wherein:
  said generating means include means for providing said corresponding waveform with a polarity opposite to the polarity of said electric error signal component waveform; and
  said modulating means include means for modulating said zero crossovers of said tachometer signal with said opposite polarity waveform to eliminate said electric error signal component.

* * * * *